(12) United States Patent
Koyanagi et al.

(10) Patent No.: US 7,262,574 B2
(45) Date of Patent: Aug. 28, 2007

(54) ROBOT OVERCURRENT PREVENTION SYSTEM

(75) Inventors: Takuro Koyanagi, Wako (JP); Takamichi Shimada, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 130 days.

(21) Appl. No.: 11/251,802

(22) Filed: Oct. 18, 2005

(65) Prior Publication Data

US 2006/0082944 A1 Apr. 20, 2006

(30) Foreign Application Priority Data

Oct. 19, 2004 (JP) .............................. 2004-303837
May 9, 2005 (JP) .............................. 2005-136011

(51) Int. Cl.
*B25J 19/02* (2006.01)
*G05B 23/02* (2006.01)

(52) U.S. Cl. ....................... 318/568.16; 318/568.24; 318/563; 318/434; 361/94; 361/100

(58) Field of Classification Search ........... 318/568.16, 318/568.24, 563, 434; 361/94, 100
See application file for complete search history.

(56) References Cited

U.S. PATENT DOCUMENTS 5,592,355 A * 1/1997 Ikkai et al. ................. 361/94
6,313,593 B1 * 11/2001 Matsubara et al. .......... 318/434
7,023,164 B2 * 4/2006 Iribe et al. .................. 318/563
7,113,376 B2 * 9/2006 Nomura et al. ............. 361/31
2004/0205417 A1 * 10/2004 Moridaira et al. ........... 714/48
2005/0179416 A1 * 8/2005 Iribe et al. .................. 318/563
2006/0007615 A1 * 1/2006 Ochiai et al. ............... 361/71
2006/0198068 A1 * 9/2006 Takahashi et al. ........... 361/42
2006/0221528 A1 * 10/2006 Li et al. ..................... 361/100

FOREIGN PATENT DOCUMENTS

JP          2001-022446       1/2001
JP          2006142470 A  *   6/2006

* cited by examiner

*Primary Examiner*—Paul Ip
(74) *Attorney, Agent, or Firm*—Squire, Sanders & Dempsey L.L.P.

(57) ABSTRACT

In an overcurrent prevention system for a robot having links connected by joints and an electrical system including electric motors installed at the joint, a power circuit connecting the electric motors to a power source, and drive circuits to supply current to the electric motors, there are provided a switching device installed in the power circuit, a current sensor detecting the current supplied to the electric motors, and the output of the current sensor is compared with a threshold value and the switching device is operated to execute a switching action to cut off the power circuit intermittently during a first predetermined period when the output of the current sensor exceeds the threshold value, thereby protecting the electrical system when overcurrent is detected, without causing functional disablement and/or posture instability of the robot.

14 Claims, 14 Drawing Sheets

ROBOT OVERCURRENT PREVENTION SYSTEM

BACKGROUND OF THE INVENTION

1. Field of the Invention

This invention relates to an overcurrent prevention system for a robot, particularly a legged mobile robot.

2. Description of the Related Art

It is a common practice in robots to protect the various components of the electrical system such as the electric motors for driving the joints by, for example, detecting the electric current passing through each motor, comparing the detected current with a threshold value to discriminate overcurrent, and suppressing the current when an overcurrent is detected. Japanese Laid-Open Patent Application No. 2001-022446, which relates to control of servomotor operation based on a given servo command, teaches improvement of servo performance at high speed and improvement of abnormal current detection accuracy at low speed by varying the threshold values in accordance with the servo command.

Although in such a configuration the suppression of applied current when an overcurrent is detected helps to protect the robot electrical system, it may under some circumstances functionally disable the robot and cause posture instability.

SUMMARY OF THE INVENTION

An object of this invention is therefore to overcome the foregoing drawback by providing a robot overcurrent prevention system that, irrespective of the circumstances, protects the electrical system of the robot when an overcurrent is detected, without causing functional disablement and/or posture instability of the robot.

In order to achieve the object, the present invention provides an overcurrent prevention system for a robot having at least a pair of links connected by a joint, and an electrical system including an electric motor installed at the joint, a power circuit connecting the electric motor to a power source, and a drive circuit installed in the power circuit to supply current to the electric motor in response to a current supply command, comprising: a switching device installed in the power circuit and cutting off the drive circuit when turned off; a current sensor generating an output indicative of the current supplied to the electric motor through the drive circuits; and an overcurrent suppressor comparing the output of the current sensor with a threshold value and executing a switching action for operating the switching device to cut off the power circuit intermittently during a first predetermined time period when the output of the current sensor exceeds the threshold value.

BRIEF DESCRIPTION OF THE DRAWINGS

The above and other objects and advantages of the invention will be more apparent from the following description and drawings in which.

DETAILED DESCRIPTION OF THE PREFERRED EMBODIMENTS

Embodiments of an overcurrent prevention system for a robot according to the present invention will now be explained with reference to the attached drawings.

Figure 1:
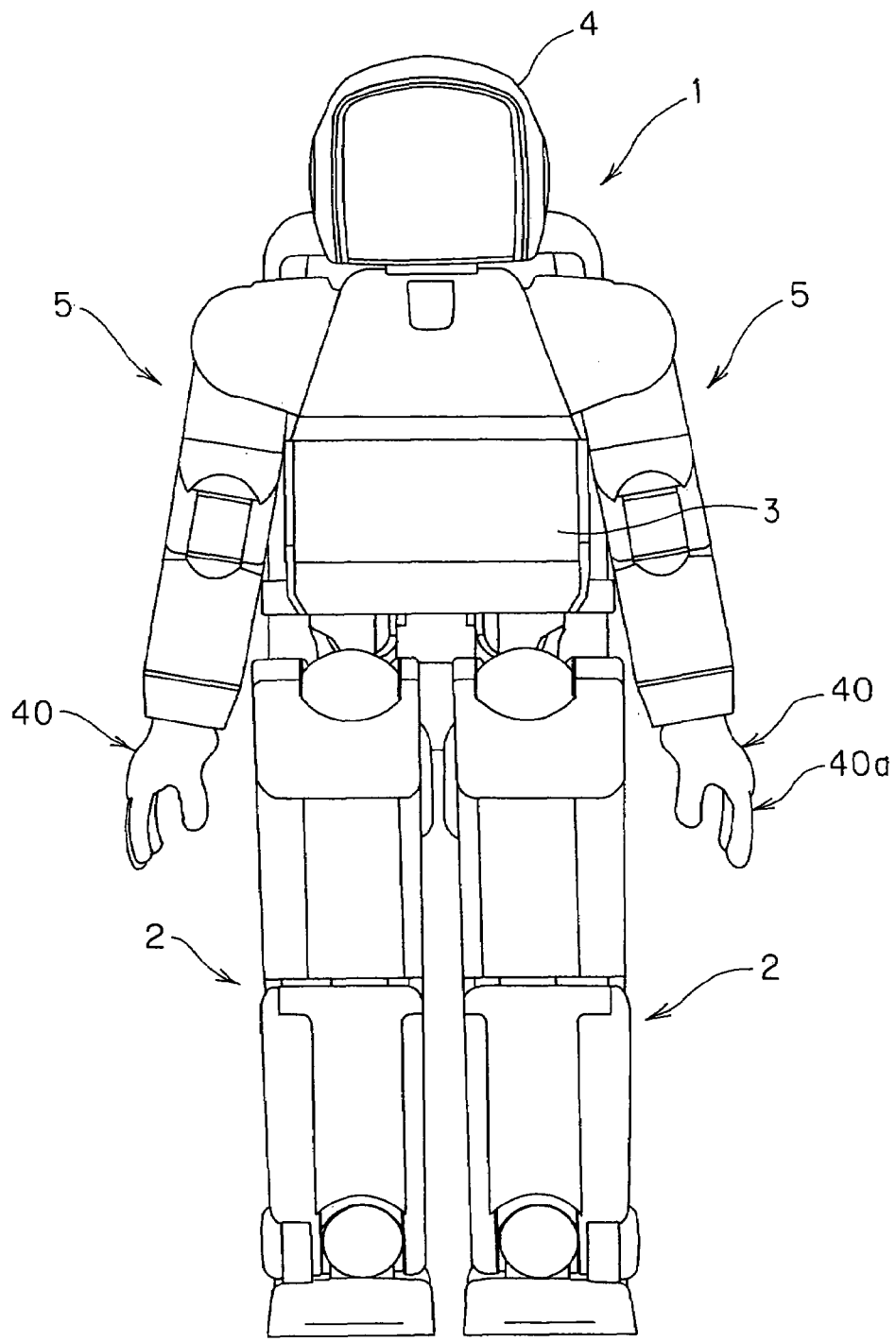
FIG. 1 is a front view of a robot, specifically a legged mobile robot, for which a robot overcurrent prevention system according to a first embodiment of this invention is provided.
Figure 2:
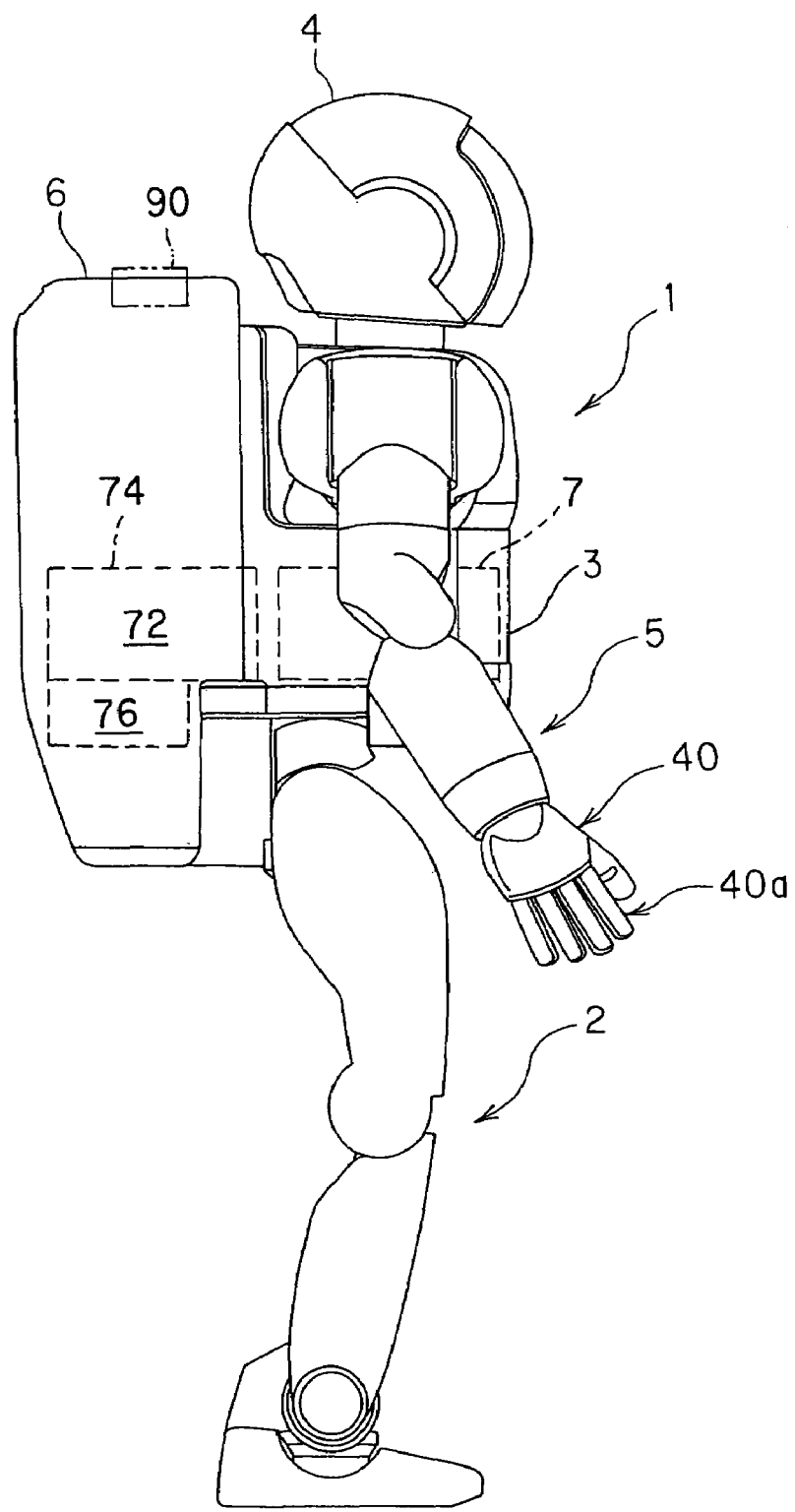
FIG. 2 is a side view of the robot of FIG. 1.

FIG. 1 is a front view of a robot for which a robot overcurrent prevention system according to a first embodiment of this invention is provided, and FIG. 2 is a side view of the robot of FIG. 1. A legged mobile robot, more specifically a biped humanoid robot with two legs and two arms is taken here as an example of a robot.

As shown in FIG. 1, a robot (legged mobile robot) 1 is equipped with a plurality of, more specifically two legs 2 and a body (main unit) 3 above the legs 2. A head 4 is formed above the body 3 and two arms 5 are connected one to either side of the body 3. As shown in FIG. 2, a housing unit 6 is mounted on the back of the body 3. A battery (power source) 7 is housed in the body 3 and an electronic control unit (explained later), etc., are accommodated in the housing unit 6. The robot 1 shown in FIGS. 1 and 2 is equipped with covers for protecting its internal structures.

Figure 3:
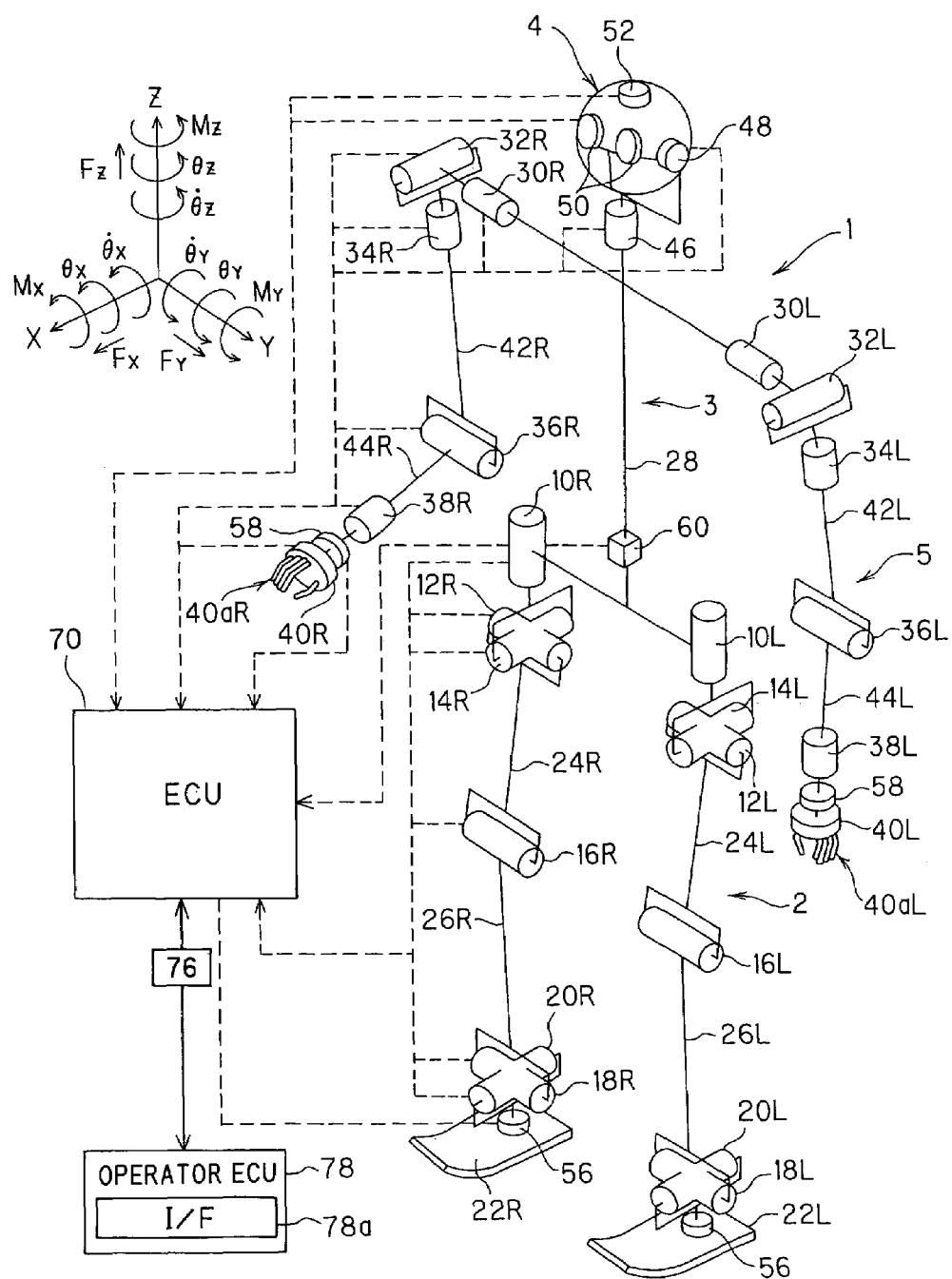
FIG. 3 is an explanatory diagram showing a skeletonized view of the robot of FIG. 1.

FIG. 3 is an explanatory diagram showing a skeletonized view of the robot 1. The internal structures of the robot 1 will be explained with reference to this drawing, with primary focus on the joints. As illustrated, the legs 2 and arms 5 on either the left or right of the robot 1 are equipped with six joints driven by eleven electric motors.

Specifically, the robot 1 is equipped at its hip (crotch) joints with electric motors 10R, 10L (R and L indicating the right and left sides; hereinafter the indications R and L will be omitted as is apparent for its symmetric structure) that drive joints for swinging or swiveling the legs 2 around a vertical axis (the Z axis or vertical axis), electric motors 12 that drive joints for swiveling or swinging the legs 2 in the pitch (advance) direction (around the Y axis), and electric motors 14 that drive joints for rotating the legs 2 in the roll (lateral) direction (around the X axis), is equipped at its knees with electric motors 16 that drive knee joints for rotating the lower portions of the legs 2 in the pitch direction (around the Y axis), and is equipped at its ankles with electric motors 18 that drive ankle (foot) joints for rotating the distal ends of the legs 2 in the pitch direction (around the Y axis) and electric motors 20 that drive the ankle joints for rotating them in the roll direction (around the X axis).

As set out in the foregoing, the joints are indicated in FIG. 3 by the axes of rotation of the electric motors that drive the joints or the axes of rotation of transmitting elements (pulleys, etc.) that transmit the power of the electric motors. Feet 22 are connected or attached to the distal ends of the legs 2.

In this manner, the electric motors 10, 12 and 14 are disposed at the hip joints of the legs 2 with their axes of rotation oriented orthogonally, and the electric motors 18 and 20 are disposed at the ankle joints with their axes of rotation oriented orthogonally. The hip joints and knee joints are connected by thigh links 24 and the knee joints and foot joints are connected by shank links 26.

The legs 2 are connected through the hip joints to the body 3, which is represented in FIG. 3 simply by a body link 28. The arms 5 are connected to the body 3, as set out above.

The arms 5 are configured similarly to the legs 2. Specifically, the robot 1 is equipped at its shoulder joints with electric motors 30 that drive joints for rotating the arms in the pitch direction and electric motors 32 that drive joints for rotating them in the roll direction, is equipped with electric motors 34 that drive joints for swiveling the free ends of the arms 5, is equipped at its elbow joints with electric motors 36 that drive the elbow joints for swiveling parts distal thereof, and is equipped at its wrist joints at the distal ends of the arms 5 with electric motors 38 that drive the wrist joints for swiveling the distal ends. Hands (end effectors) 40 are attached to the distal ends of the wrist joints.

The electric motors 30, 32 and 34 are disposed at the shoulder joints of the arms 5 with their axes of rotation oriented orthogonally. The shoulder joints and elbow joints are connected by upper arm links 42 and the elbow joints and wrist joints are connected by forearm links 44. Each hand 40 is equipped with a mechanism that drives five fingers 40a such that the robot 1 grasps an object by the fingers 40a or does other works.

The head 4 is connected to the body 3 through an electric motor 46 (that constitutes a neck joint) for rotating the head 4 around the vertical axis and a head nod mechanism 48 that rotates the head 4 around an axis perpendicular thereto. As shown in FIG. 3, the interior of the head 4 has mounted therein two CCD cameras 50 that take and produce outputs indicative of stereoscopic images, and a voice input/output device 52.

Owing to the foregoing configuration, the legs 2 are each provided with 6 joints constituted of a total of 12 degrees of freedom for the left and right legs, so that during locomotion the legs 2 as a whole can be imparted with desired movements by driving (displacing) the 6 joints to appropriate angles to enable desired walking in three-dimensional space. Further, the arms 5 are each provided with 5 joints constituted of a total of 10 degrees of freedom for the left and right arms, so that desired works or tasks can be carried out by driving (displacing) these 5 joints to appropriate angles. In addition, the head 4 is provided with the joint and the head nod mechanism 48 constituted of 2 degrees of freedom, so that the head 4 can be faced in a desired direction by driving these to appropriate angles.

Each of the electric motors 10 and the like is provided with a rotary encoder (not shown) that produces an output or signal corresponding to at least one among the angle, angular velocity and angular acceleration of the associated joint produced by the rotation of the rotary shaft of the electric motor. Specifically, the electric motors 10 and the like comprise DC servo motors.

A conventional six-axis force sensor (hereinafter referred to "force sensor") 56 is attached to each foot 22 and produces outputs or signals representing, of the external forces acting on the robot, the floor reaction force components Fx, Fy and Fz of three directions and the moment components Mx, My and Mz of three directions acting on the robot 1 from the surface of contact.

A similar force sensor (six-axis force sensor) 58 is attached to a position between each of the wrist joints and hands 40 and produces outputs or signals representing the external forces acting on the robot 1 other than the floor reaction force, specifically, the external force (object reaction force) components Fx, Fy and Fz of three directions and the moment components Mx, My and Mz of three directions acting on the hands 40 from the object.

An inclination sensor 60 is installed on the body 3 and produces an output or signal representing at least one of the inclination (tilt angle) of the body 3 relative to the vertical axis and the angular velocity thereof, i.e., representing at least one quantity of state such as the inclination (posture) of the body 3 of the robot 1.

The outputs of the force sensor 56, etc., are sent to the electronic control unit (now assigned with reference numeral 70; hereinafter referred to as "ECU") stored in the housing unit 6 (in the figure, the input/output is shown only for the right side of the robot 1 for ease of illustration). The ECU 70 comprises a microcomputer having a CPU, a memory, an input/output interface and the like. The ECU 70 calculates joint angular displacement commands to be used to control the electric motor 10 and other motors constituting the joints so as to enable the robot 1 to keep a stable posture while moving.

As set out in the foregoing, the battery (power source) 7 is accommodated in the body 3. In the housing unit 6, there is disposed a power supply box 74 that comprises a DC/DC converter (not shown) which transforms the output voltage (direct voltage) of the battery 7 and drive circuits (motor drivers) 72 such as the electric motors 10 etc., and a wireless system 76.

The ECU 70 is connected to an operator ECU 78 that similarly comprises a microcomputer so as to freely communicate each other through the wireless system 76. The operator ECU 78 is installed with an interface (I/F) 78a and any command such as an emergency robot stop command inputted through the interface 78a by the operator (user) is sent to the ECU 70 through the wireless system 76.

Figure 4:
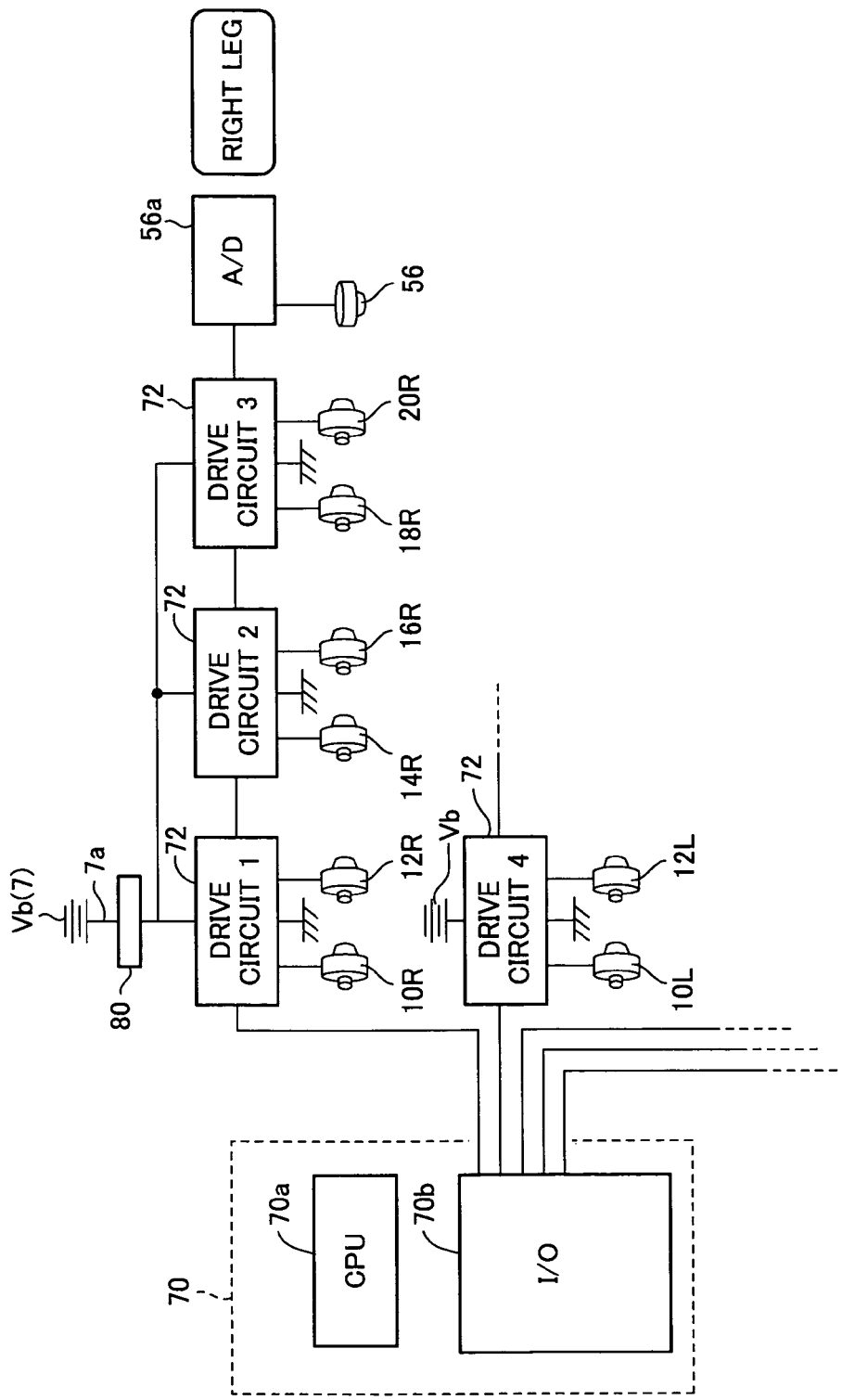
FIG. 4 is a block diagram showing the configuration of an ECU with particular focus on an electrical system.

FIG. 4 is a block diagram showing the configuration of the ECU 70 with particular focus on the electrical system (including the electric motors and drive circuits 72, etc.).

As mentioned above, the ECU 70 is equipped with a CPU (central processing unit) 70a, an I/O (input/output interface) 70b and a memory (not shown). The drive circuits 72 each associated with two electric motors (e.g., motors 10, 12) are connected with a drive circuit 1, drive circuit 2 and so on. (Although the drawing shows only part of the configuration centering mainly on the right-side leg 2, the remainder of the configuration for the body 3, head 4 and arms 5 is similar).

The drive circuits 72 are installed in a power circuit 7a that interconnects the battery (power source) 7 and the electric motors (shown only for the motor 10R). The force sensor 56 is connected to an A/D (analog/digital) converter 56a. The drive circuits 72, the A/D converter 56a and so forth are connected to the CPU 70a through the I/O 70b. The power circuit 7a also incorporates an overcurrent prevention circuit 80 to be explained below.

Figure 5:
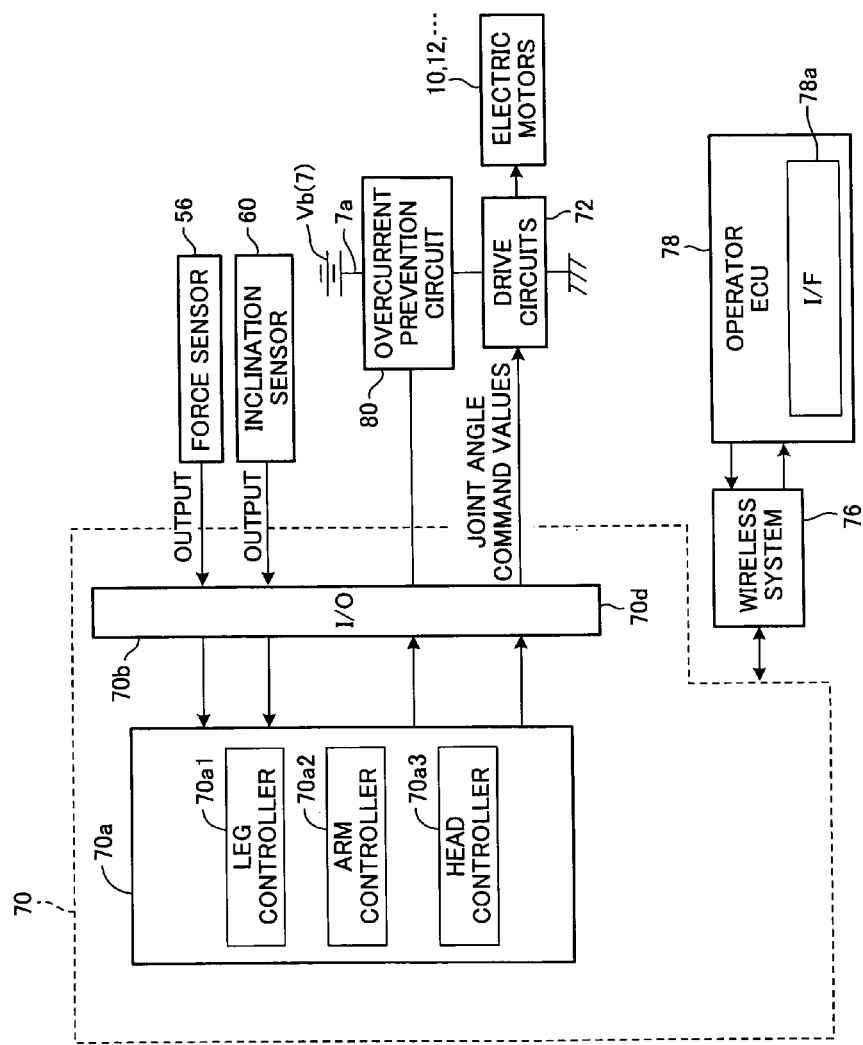
FIG. 5 is a block diagram functionally showing the operation of a CPU shown in FIG. 4, including the operation thereof as an overcurrent prevention system.

FIG. 5 is a block diagram functionally showing the operation of the CPU 70a shown in FIG. 4, including the operation thereof as an overcurrent prevention system.

The CPU 70a is equipped with a leg controller 70a1, an arm controller 70a2 and a head controller 70a3. Based on gait parameters generated beforehand and stored in the memory (not shown), the leg controller 70a1 generates gaits successively in response to the outputs of the force sensor 56 and inclination sensor 60 inputted through the I/O 70b and based on the generated gaits, determines joint angle command values (current command values) and drives the motors 10 and other motors through the drive circuits 72 so as to eliminate error or deviation from the joint angles detected from the outputs (not shown) of rotary encoders. In this manner, each of the drive circuits 72 energizes and drives the motors associated therewith in response to the current command value.

The arm controller 70a2 and head controller 70a3 also calculate joint angle command values based on the generated gaits and the outputs of the force sensor 56 and inclination sensor 60, and based on the calculated value, drive the motors 30 and other motors through the associated drive circuits 72. The arm controller 70a2 controls the operation of the arms 5 in accordance with the nature of the task to be performed and the head controller 70a3 controls the operation of the motor 46 and/or head nod mechanism 48 in accordance with the instructions of the image recognition system.

The foregoing configuration includes the overcurrent prevention circuit 80 incorporated in the power circuit 7a.

Figure 6:
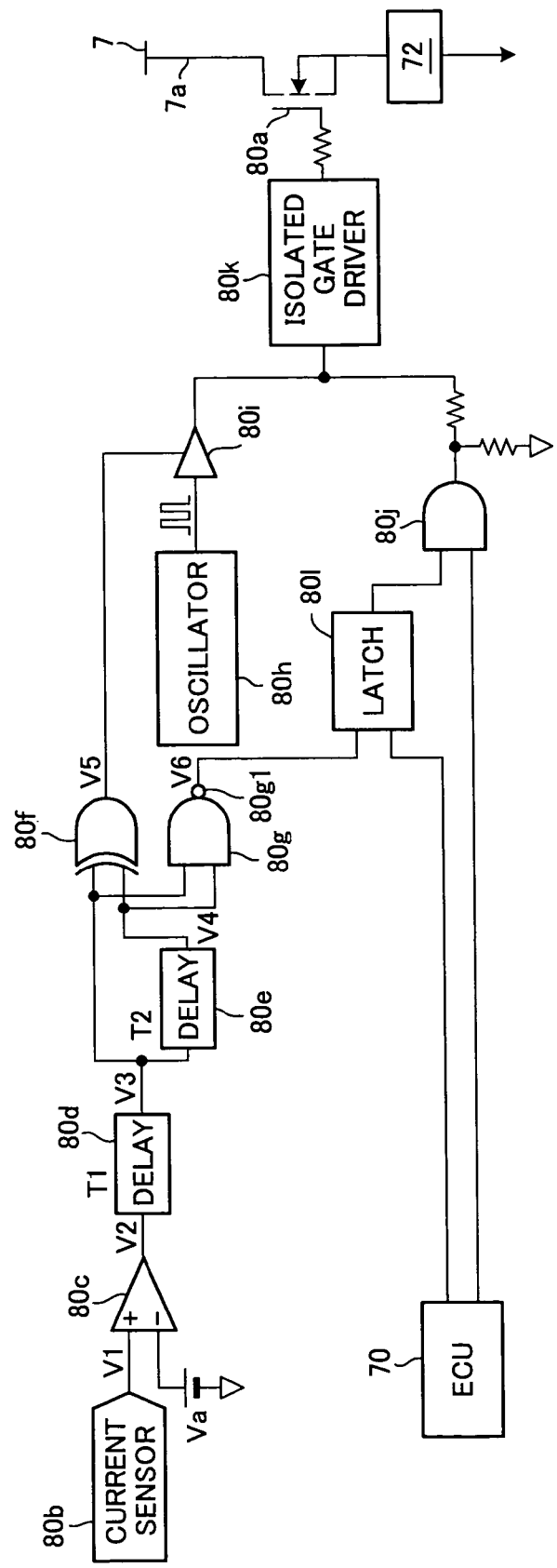
FIG. 6 is a block diagram showing the concrete configuration of an overcurrent prevention circuit shown in FIG. 5.

FIG. 6 is a block diagram showing the concrete configuration of the overcurrent prevention circuit 80.

The overcurrent prevention circuit 80 incorporated in the power circuit 7a comprises a FET (MOSFET; switching device) 80a that cuts off, i.e., discontinues the supply of current to the power circuit 7a when made or turned OFF, a current sensor 80b that produces an output indicative of the current supplied through the drive circuits 72 to the motors 10 and other motors, and an overcurrent suppressor that compares the output of the current sensor 80b (denoted as "V1") with a threshold value (denoted as "Va") and executes a switching action for operating the FET 80a to cut off (de-energize) the power circuit 7a intermittently during a first predetermined time period when the output of the current sensor 80b exceeds the threshold value.

The overcurrent suppressor comprises a comparator 80c that inputs or receives the output of the current sensor 80b on its positive input terminal and a predetermined voltage as the threshold value (Va) on its negative input terminal and generates an H level output when the output of the current sensor exceeds the threshold value, a first delay circuit 80d that inputs or receives the output of the comparator 80c (value V2) and delays it by a predetermined time period T1 (second predetermined time period; e.g., 10 to 20 msec), a second delay circuit 80e that inputs or receives the output of the first delay circuit 80d (denoted as "V3") and delays it by a predetermined time period T2 (first predetermined time period; e.g., 100 to 200 msec), an EX-OR (exclusive-OR) circuit 80f that inputs or receives the output of the first delay circuit and the output of the second delay circuit (denoted as "V4"), and a first AND circuit 80g that inputs or receives the same outputs in parallel with the EX-OR circuit 80f. The combination of the AND circuit 80g and an inverter 80g1 through which its output is outputted or forwarded, constitutes an NAND circuit. The outputs of the EX-OR circuit 80f and AND circuit 80g are denoted as values "V5" and "V6".

Figure 7A:
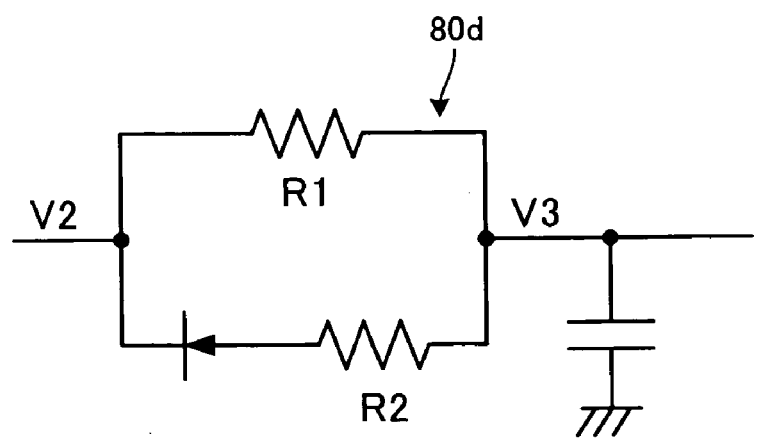
FIG. 7 is a set of diagrams, in which 7A is a block diagram showing the particulars of a first delay circuit and 7B is a graph showing the characteristic curve of the first delay circuit.
Figure 7B:
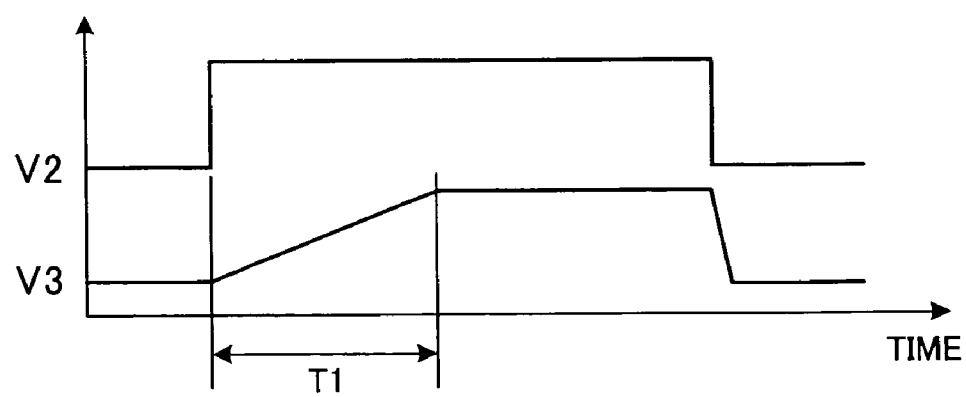

FIG. 7A is a block diagram showing the particulars of the first delay circuit 80d, and FIG. 7B shows the characteristic curve of the first delay circuit 80d. As can be seen in FIG. 7B, the falling edge of V3 becomes steeper than its rising edge when in the circuit of FIG. 7A the value of the resistor R1 is made much greater than that of the resistor R2. Although not shown in the drawings, the second delay circuit 80e is configured similarly to the first delay circuit 80d except that its resistors and the like are given different values so as to make the delay time period T2 about ten times longer than the delay time period T1 of the first delay circuit 80d.

The explanation of FIG. 6 will be continued.

The overcurrent suppressor further comprises an oscillator 80h that outputs a pulse train, a buffer 80i that is connected to and inputs or receives the pulse train output of the oscillator 80h, a second AND circuit 80j that is connected to and inputs or receives the outputs of the AND circuit (NAND circuit) 80g and the ECU 70 (that outputs an H level signal indicative of current supply command), and an isolated gate driver 80k connected to the AND circuit 80j through a resistor and to the buffer 80i directly. The isolated gate driver 80k is connected to the FET 80a through a resistor. The output V6 of the AND circuit 80g is latched by a latch circuit 80l and unlatched by the ECU 70.

The buffer 80i is connected to the EX-OR circuit 80f. When the output of the EX-OR circuit 80f is H level, the buffer 80i outputs or forwards the pulse output of the oscillator 80h immediately (unmodified), and when the output of the EX-OR circuit 80f is L level, it assumes a high-impedance state (produces no output).

Figure 8:
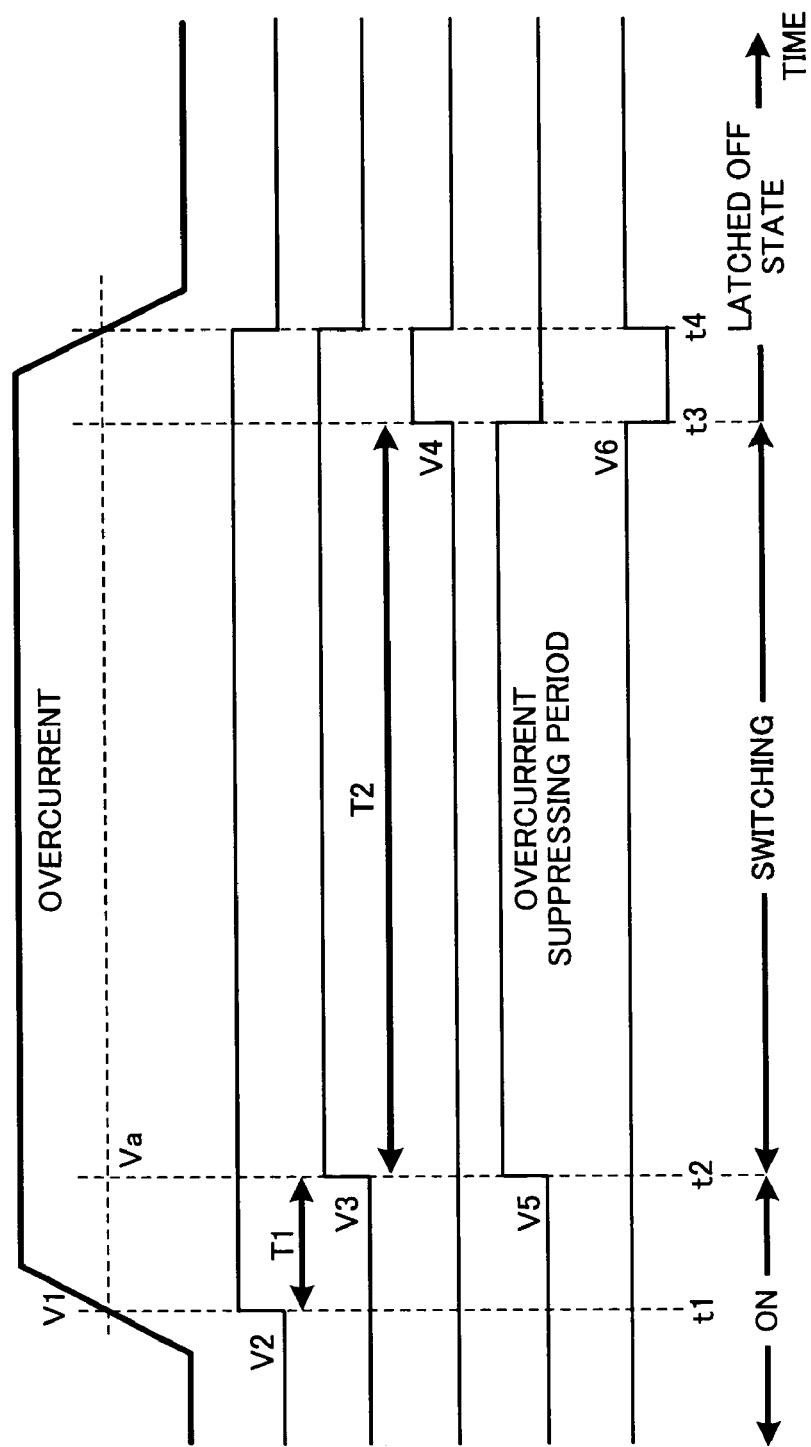
FIG. 8 is a time chart showing the operation of the overcurrent prevention circuit shown in FIG. 6.
Figure 9:
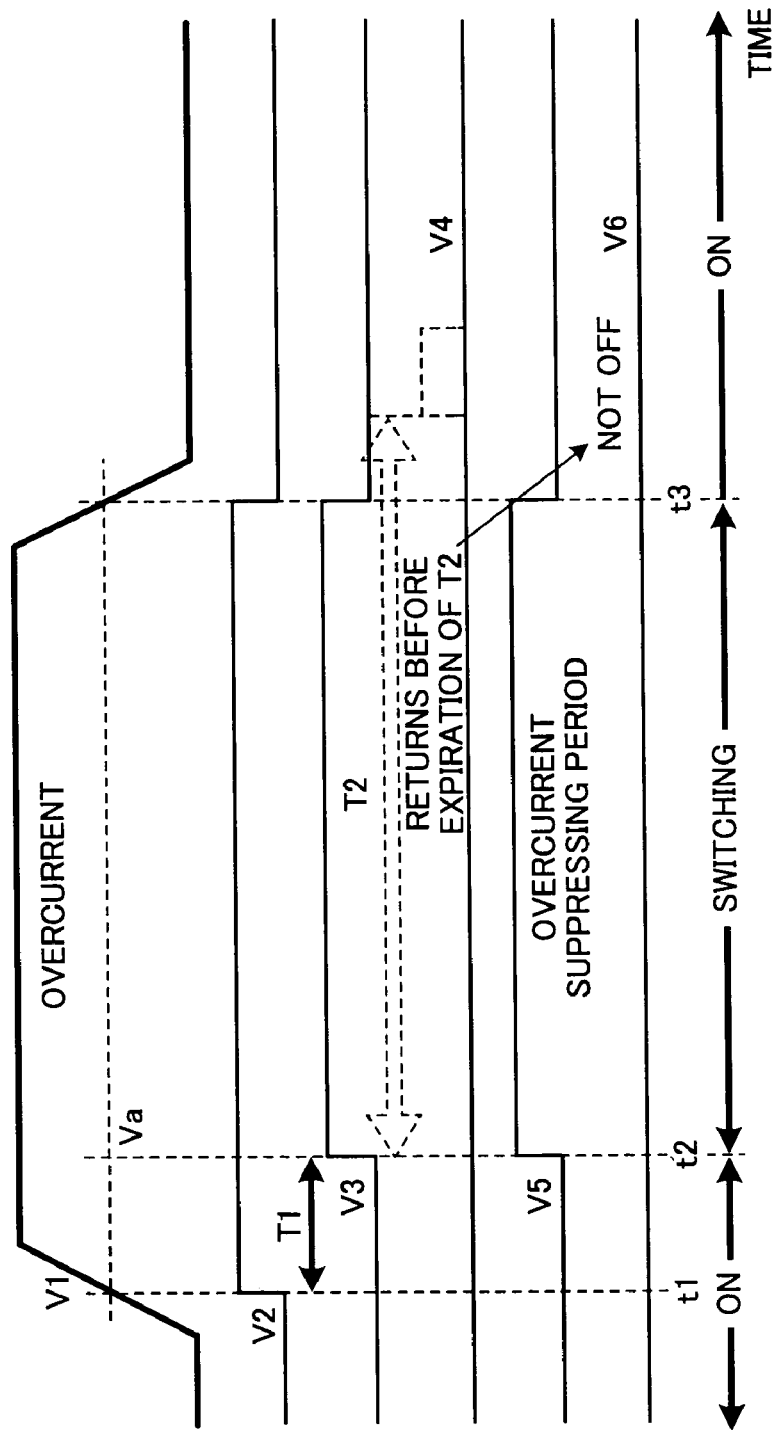
FIG. 9 is a time chart similarly showing the operation of the overcurrent prevention circuit shown in FIG. 6.

FIGS. 8 and 9 are time charts showing the operation of the overcurrent prevention circuit 80 shown in the FIG. 6. The time chart of FIG. 8 relates to the case where an overcurrent condition (i.e., overload condition) continues for the time period of T1+T2 or longer, and the time chart of FIG. 9 relates to the case where it subsides earlier.

The operation of the overcurrent prevention circuit 80 shown in FIG. 6 will now be explained with reference to FIG. 8.

Assuming that the output of the current sensor 80b exceeds the threshold value Va at time point t1, the output V2 of the comparator 80c becomes H level but the first delay circuit 80d delays the change in its output V3 by the predetermined time period T1. This is for avoiding faulty operation owing to noise and the like.

When the output V3 of the first delay circuit 80d becomes H level at time point t2, the input to the EX-OR circuit 80f also becomes H level. However, the output V4 of the second delay circuit 80e remains at L level because the second delay circuit 80e delays the output V3 of the first delay circuit 80d by the predetermined time period T2. The second delay circuit 80e is provided for producing a delay of T2 in order to ascertain whether the overcurrent is transient. That is why the predetermined time period T2 is made about ten times longer than T1.

The output V5 of the EX-OR circuit 80f therefore becomes H level at time point t2. Although the input V4 to the AND circuit 80g is L level, the output V6 of the AND circuit 80g becomes H level because it is inverted by inverter 80g1.

The output V6 of the AND circuit 80g is supplied or sent to the AND circuit 80j through the latch circuit 80l. The output of the ECU 70 is inputted or applied to the other terminal of the AND circuit 80j. Since the ECU 70 normally outputs an ON signal (H level signal), the output of the AND circuit 80j is normally H level.

As a result, the pulse train outputted from the oscillator 80h is supplied to the gate terminal of the FET 80a through the isolated gate driver 80k. The FET 80a turns ON with the H level (gate potential) in the pulse train and supplies current to the drive circuits 72, whereas the FET 80a becomes nonconductive with the L level in the pulse train and discontinues the current supply to the drive circuits 72. This switching action effected by turning the FET 80a ON and OFF intermittently cuts off current flow through the power circuit 7a including the drive circuits 72, thereby suppressing the amount of power supplied and thus suppressing overcurrent.

Thereafter, provided that overcurrent continues to be detected, the output V4 of the second delay circuit 80e also becomes H level at time point t3, so that the output of the EX-OR circuit 80f becomes L level and the output of the AND circuit 80g also becomes L level. The output of the AND circuit 80j therefore also becomes L level. As a result, the output of the isolated gate driver 80k becomes L level, causing the FET 80a to turn OFF (become nonconductive) to completely cut off the supply of current to the drive circuits 72. When V5 is L level, the buffer 80i assumes a high-impedance state and produces no output.

As shown in FIG. 8, when overcurrent is no longer being detected at time point t4, output V2 switches to L level. Since the configuration is such that, as shown in FIG. 7B, almost no delay is caused when the current decreases (resumes the normal value), outputs V3 and V4 also switch to L level almost simultaneously.

The FET 80a remains OFF until the latched OFF state is unlatched by the ECU 70. Once the OFF state is unlatched by the ECU 70, the output of the isolated gate driver 80k becomes H level and the FET 80a turns ON (becomes conductive) to resume supply of current to the drive circuits 72. When V5 is L level, the buffer 80i assumes a high-impedance state and produces no output.

In the case shown in FIG. 9, the output of the current sensor 80b at time point t3 is lower than the threshold value and overcurrent is therefore not detected, so that all of values V2, V3, V4 and V5 become L level. Therefore, following the implementation of the switching action, uninterrupted supply of current to the drive circuits 72 is resumed.

Figure 10A:
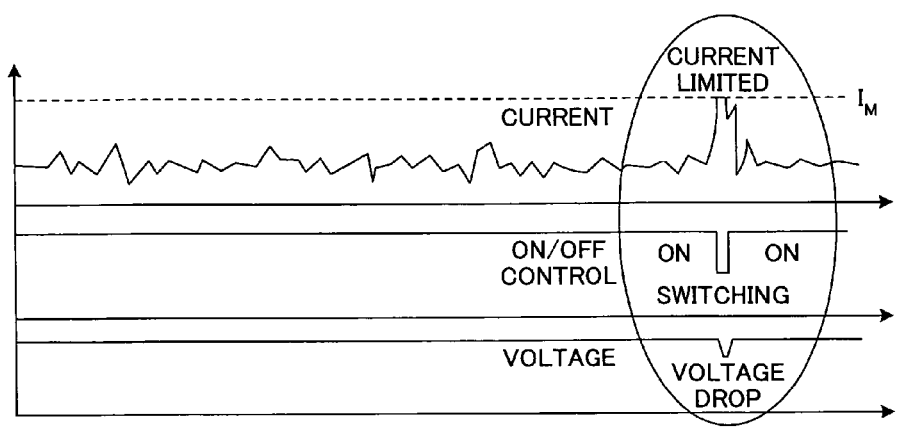
FIG. 10 is a set of graphs, in which 10A is an explanatory graph showing changes in current and voltage that are caused by the operation of the overcurrent prevention circuit shown in FIGS. 6 and 10B is an explanatory graph showing the case where only overcurrent protection is implemented in response to an overcurrent.
Figure 10B:
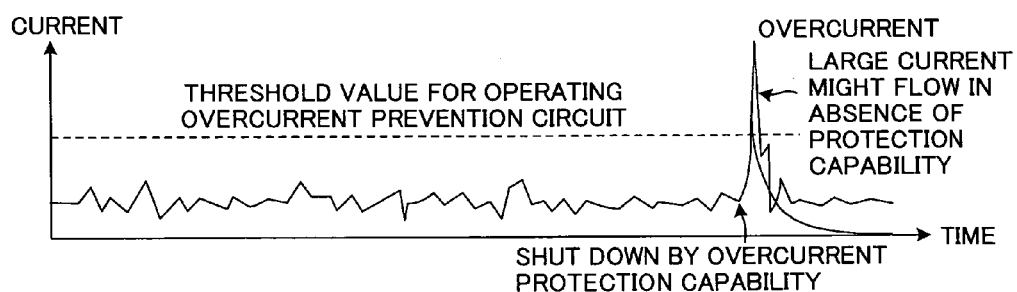

FIG. 10A is a graph for explaining the effect of the operation of the foregoing embodiment on current and voltage. FIG. 10B is a graph for explaining the case where only overcurrent protection is implemented in response to an overcurrent.

As shown in FIG. 10B, the large current that might flow in the absence of overcurrent protection capability can be suppressed when overcurrent protection capability is provided. However, the supply of current falls sharply following the suppression, so that the robot 1 experiences functional failure and attitude instability.

In the case of this embodiment, on the other hand, as shown in FIG. 10A, the execution of the switching action is limited to within the time period of overcurrent flow, so that the voltage decrease is minimal. In other words, current suppression is limited to the time period of overcurrent detection, making it possible to hold current decrease to the minimum in the region below the threshold value Va.

In this case, the robot 1 cannot operate exactly as intended by the motion algorithm. However, when, for example, the foot 22 of the robot 1 trips on a bump on the ground so that overcurrent arises in the motors 18 and 20, this event can usually be remedied in around several hundred milliseconds, so that the posture can be restored by the motion control (determined by the joint angle command values) after return to normal operation.

In other words, in this embodiment, the establishment of the delay time period T2 enables overcurrents attributable to a system abnormality such as wiring shorting to be distinguished from overcurrents attributable to a momentary load surge owing to, for instance, the foot 22 tripping on a bump during walking. In addition, the power circuit 7a is intermittently cut off only during the time period that the overcurrent continues. As a result, the components of the electrical system such as the electric motors 18 and 20 can be protected without causing functional disablement and/or posture instability of the robot 1, irrespective of the circumstances. The ability of the embodiment to avoid posture instability is particularly beneficial in this embodiment because the robot 1 is a legged mobile robot.

In addition, the fact that the overcurrent prevention circuit 80 is constituted of discrete circuits simplifies the configuration.

The overcurrent prevention circuit 80 is configured so that when the output V1 of the current sensor 80b exceeds the threshold value Va, the switching action is conducted for the time period T2 (first predetermined time period) after the period T1 (second predetermined time period) has elapsed. This provides another advantage in that it enables overcurrent to be reliably detected while eliminating the effect of noise and the like.

Figure 11:
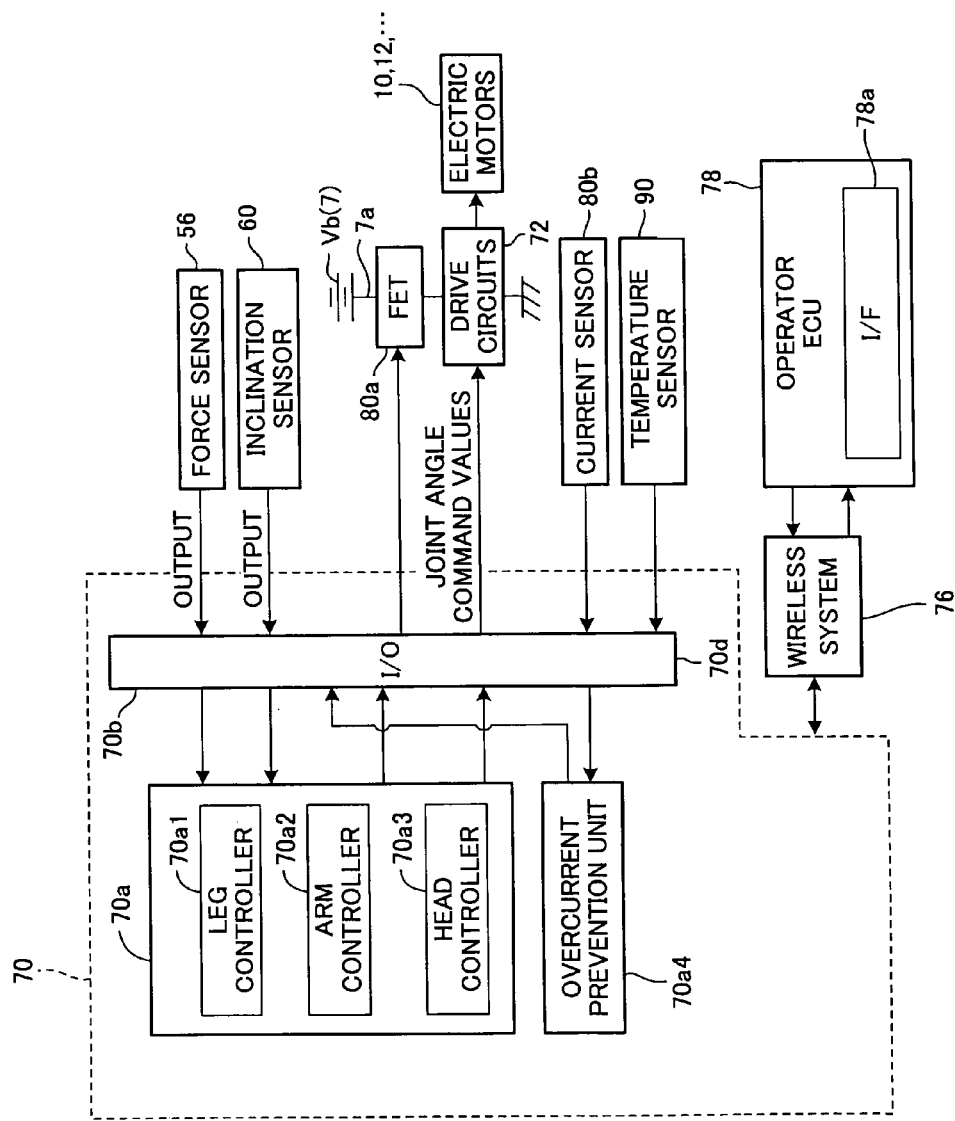
FIG. 11 is a block diagram, similar to FIG. 5, but showing a robot overcurrent prevention system according to a second embodiment of this invention.

FIG. 11 is a block diagram, similar to FIG. 5, but showing a robot overcurrent prevention system according to a second embodiment of this invention.

The second embodiment will be explained with focus on the points of difference from the first embodiment. The robot overcurrent prevention system according to the second embodiment is provided with a temperature sensor 90 for detecting ambient temperature TA and changes the threshold value Va and predetermined time period T2 (first predetermined time period) in response to the detected temperature, and the ECU 70 (more exactly the CPU 70a) is equipped with an overcurrent prevention unit 70a4 that conducts the overcurrent prevention operation. The overcurrent prevention unit 70a4 is a unit whose functions are implemented by use of software.

As indicated by a phantom line in FIG. 2, the temperature sensor 90 of the second embodiment is installed at a suitable part of the housing unit 6 so as to be exposed to the ambient air. The temperature sensor 90 produces an output representing the ambient temperature TA, i.e., the temperature of the air surrounding the robot 1. Constituent elements of the second embodiment similar to those of the first embodiment are assigned the same reference symbols as in the first embodiment and will not be explained again.

Figure 12:
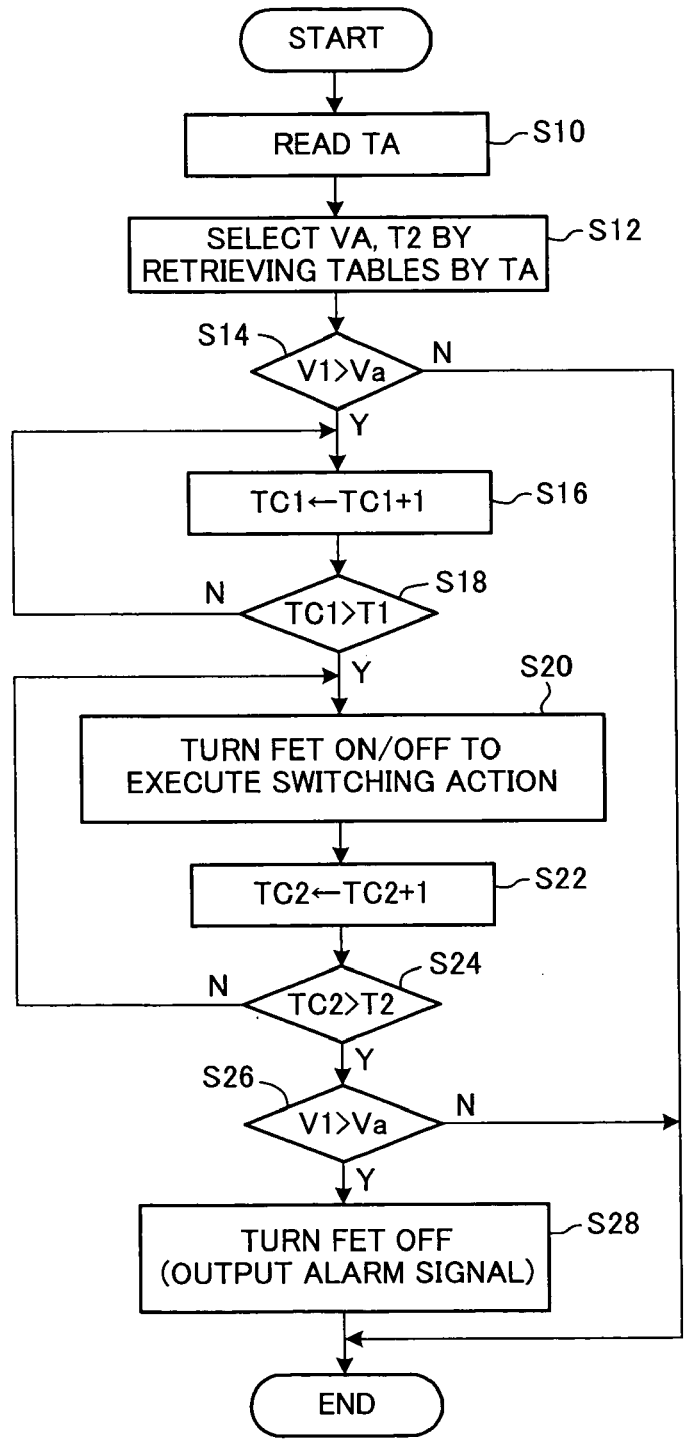
FIG. 12 is a flowchart showing the operation of the system shown in FIG. 11.

FIG. 12 is a flowchart showing the operation of the system, more specifically the sequence of processing steps of the overcurrent prevention operation executed by the CPU 70a.

Figure 13A:
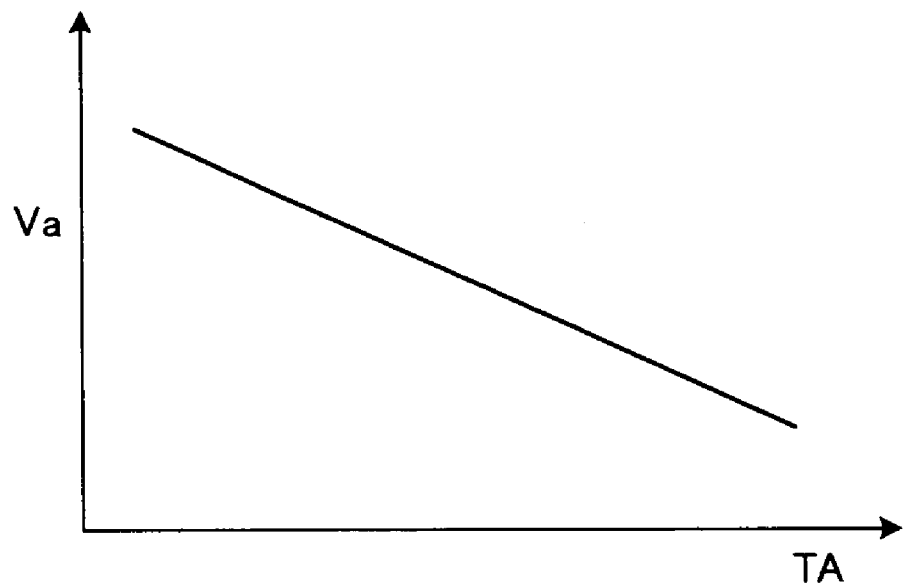
FIG. 13 is a set of graphs showing characteristic curves of a threshold value Va and a predetermined time period T2 (first predetermined time period) with respect to an ambient temperature TA, which are used in the processing of the system shown in FIG. 11.
Figure 13B:
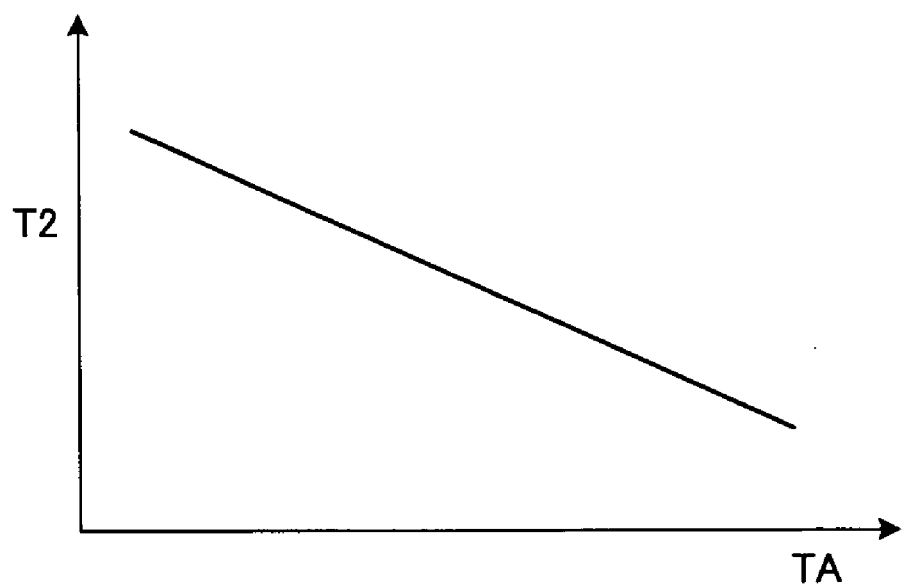

In S10, the ambient temperature TA detected by the temperature sensor 90 is read. Next, in S12, the threshold value Va is selected by using the read ambient temperature TA to retrieve the corresponding value from the characteristic curve shown in FIG. 13A, and the predetermined time period T2 (first predetermined time period) is selected by similarly using the read ambient temperature TA to retrieve the corresponding value from the characteristic curve shown in FIG. 13B.

The threshold value Va is determined or defined to decrease with increasing ambient temperature TA. This is because overcurrent is more likely to be detected as the temperature of the motors, such as the motors 18 and 20, and of their drive circuits 72 increases, which is more likely to happen in proportion as the ambient temperature TA increases. For the same reason, the predetermined time period T2 is also determined or defined to decrease with increasing ambient temperature TA, so as to shorten the switching action period and supply current to the drive circuits 72 earlier.

Next, in S14, it is determined whether the output V1 indicative of the current detected by the current sensor 80b is greater than the threshold value Va, i.e., greater than the value selected in S12. When the result in S14 is NO, the remaining processing steps are skipped. When it is YES, the program goes to S16, in which the count of a time counter TC1 is incremented by one, and to S18, in which it is determined whether the count of the time counter TC1 is greater than the time period T1. When the result in S18 is NO, the program returns to S16.

When the result in S18 is YES, the program goes to S20, in which the switching action of the FET 80a described with respect to the first embodiment is initiated.

Next, in S22, the count of a second time counter TC2 is incremented by one and then, in S24, it is determined whether the count of the second time counter TC2 exceeds the selected time period T2. When the result in S24 is NO, the program returns to S20. As a result, the power circuit 7a is intermittently cut off during the time period T2.

When the result in S24 is YES, the program goes to S26, in which it is again determined whether the output V1 indicative of the current detected by the current sensor 80b is greater than the threshold value Va. When the result in S26 is NO, the remaining step is skipped, and when it is YES, the program goes to S28, in which the FET 80a is turned OFF to discontinue the current supply to the power circuit 7a and an alarm signal is outputted via the wireless system 76 and operator ECU 78. As a result, the power circuit 7a remains de-energized as long as overcurrent is detected.

The foregoing configuration of the robot overcurrent prevention system according to the second embodiment enables it to provide the same merits as that according to the first embodiment.

Moreover, since the robot overcurrent prevention system according to the second embodiment is configured to detect the ambient temperature TA and change the threshold value Va and predetermined time period T2 in response to the detected ambient temperature TA, it achieves the further effects of, when the temperature of the motors 18 and 20 and other motors tends to increase, enabling early detection of overcurrent by lowering the threshold value, and of enabling early cut-off of current to the drive circuits 72 by also shortening the predetermined time period T2, whereby the drive circuits 72 and the like can be still better protected.

Moreover, the robot overcurrent prevention system according to the second embodiment is configured to output an alarm signal when the FET 80a is turned OFF to cut off (de-energize) the power circuit 7a, so that it offers the additional merit of being able to alert the user (operator) to abnormal operation, namely, the occurrence of overcurrent.

In the foregoing configuration, when a degree of latitude remains in the temperature resistance of the FET 80a, the predetermined time period T1 can be extended in accordance with the detected ambient temperature TA. This eliminates the effect of noise and the like still more effectively.

It is also possible to add a temperature sensor or sensors for detecting the temperature of one or both of the battery 7 and drive circuits 72 and to change the threshold value Va and/or the predetermined time period T2 in response to the detected temperature(s). In addition, it is possible to provide a voltage sensor or sensors for detecting one or both of the battery 7 and drive circuits 72 and to change the threshold value Va and/or the predetermined time period T2 in response to the detected voltage(s). The threshold value Va and/or the predetermined time period T2 can also be changed taking into account the walking condition and the like of the robot.

Figure 14:
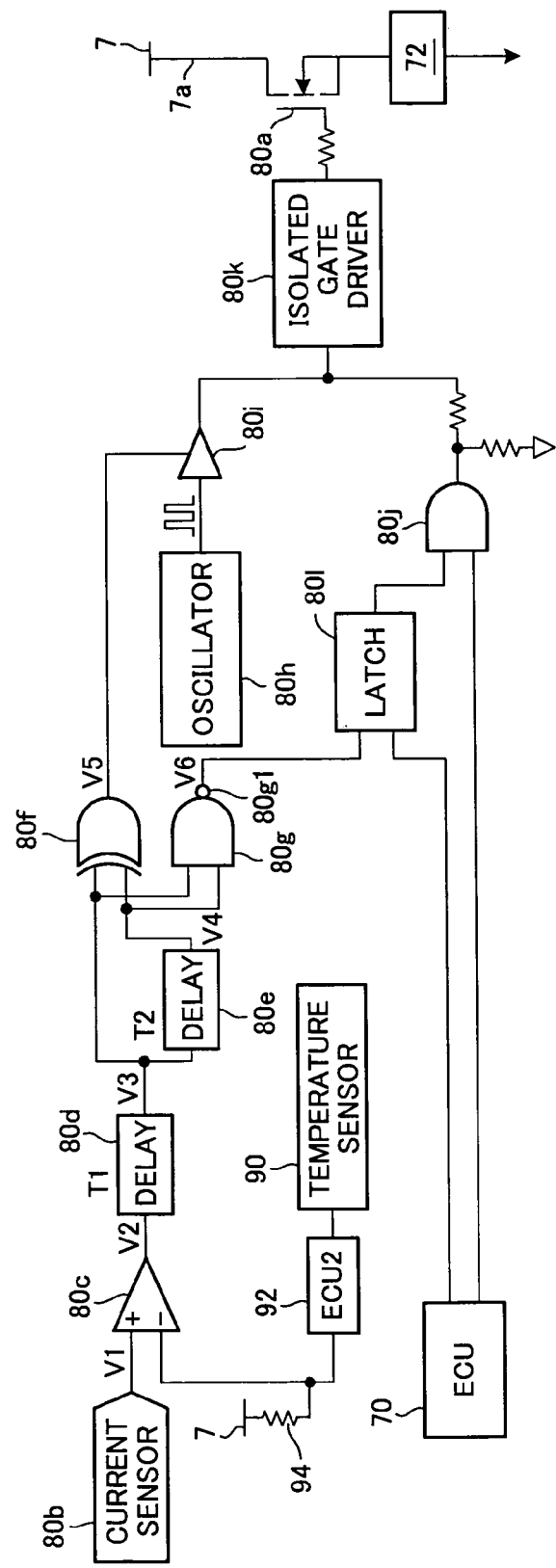
FIG. 14 is a block diagram, similar to FIG. 6, but showing an overcurrent prevention system in accordance with a third embodiment of the invention.

FIG. 14 is a block diagram, similar to FIG. 6, but showing an overcurrent prevention system in accordance with a third embodiment of the invention.

The third embodiment will be explained with focus on the points of difference from the first and second embodiments.

The robot overcurrent prevention system according the third embodiment is configured to incorporate a configuration like that of the second embodiment in the configuration of the first embodiment.

Specifically, the robot overcurrent prevention system according to the third embodiment is provided in the vicinity of the temperature sensor 90 with a second ECU (ECU2) 92 that is constituted as a one-chip microprocessor and is a separate unit from the ECU 70. The second ECU 92 is interconnected with associated components by an appropriate cable (not shown) or the like. It inputs or receives the output TA of the temperature sensor 90 and converts it to a value corresponding to the threshold value Va to be inputted to the one input terminal of the comparator 80c.

More specifically, the second ECU 92 inputs the analog output TA of the temperature sensor 90 and converts it to a digital signal, determines a suitable voltage (threshold value) Va in accordance with the characteristic curve shown in FIG. 13, converts it to an analog signal, and forwards the converted output (voltage Va) to the one input terminal of the comparator 80c. The path connecting the second ECU 92 to the comparator 80c branches off through a pull-up resistor 94 to connect with the battery 7. In other aspects the configuration is the same as that of the robot overcurrent prevention system according to the first embodiment.

Owing to the foregoing configuration, the robot overcurrent prevention system according to the third embodiment offers the same merits as that of the second embodiment except for not being able to change the predetermined time period T2 in response to the detected ambient temperature TA. In addition, although the output of the temperature sensor 90 is an analog signal that tends to be affected by noise, the second ECU 92 provided separately of the ECU 70 is situated near the temperature sensor 90 to enable connection via a short cable, thereby avoiding faulty operation.

Thus, the first to third embodiments are configured to have an overcurrent prevention system for a robot (1) having at least a pair of links (e.g., thigh link 24, shank link 26) connected by a joint, and an electrical system including an electric motor (16) installed at the joint, a power circuit (7a) connecting the electric motor to a power source (battery 7), and a drive circuit (72) installed in the power circuit to supply current to the electric motor in response to a current supply command, characterized in that: a switching device (MOSFET 80*a*) installed in the power circuit and cutting off the drive circuit when turned off; a current sensor (80*b*) generating an output indicative of the current supplied to the electric motor through the drive circuits; and an overcurrent suppressor (comparator 80*c*, first delay circuit 80*d*, second delay circuit 80*e*, EX-OR circuit 80*f*, AND circuit 80*g*, oscillator 80*h*, buffer 80*i*, AND circuit 80*j*, isolated gate driver 80*k*, latch circuit 801, electronic control unit 70) comparing the output of the current sensor with a threshold value (Va) and executing a switching action for operating the switching device to cut off the power circuit intermittently during a first predetermined time period (T2) when the output of the current sensor exceeds the threshold value.

In the system, the overcurrent suppressor executes the switching action during the first predetermined time period when a second predetermined time period (T1) has passed after the output of the current sensor exceeded the threshold value.

The system further includes: a temperature sensor (90) detecting an ambient temperature; and the overcurrent suppressor changes the threshold value or the first predetermined time period in response to the detected ambient temperature.

In the system, the overcurrent suppressor comprises; a comparator (80*c*) inputting the output of the current sensor and a predetermined voltage indicative of the threshold value and generating an H level output when the output of the current sensor exceeds the threshold value; a first delay circuit (80*d*) inputting the output of the comparator and delaying an output by the second predetermined time period; a second delay circuit (80*e*) inputting the output of the first delay circuit and delaying an output by the first predetermined time period; an EX-OR circuit (80*f*) inputting the outputs of the first and second delay circuits; a first AND circuit (80*g*) inputting the same outputs in parallel with the EX-OR circuit; an oscillator (80*h*) outputting a pulse train; a buffer (80*i*) connected to the EX-OR circuit and passing the output of the oscillator when the EX-OR circuit generates an H level output; an electronic control unit (70) outputting an H level signal indicative of the current supply command; a second AND circuit (80*j*) inputting outputs of the first AND circuit and the electronic control unit; and an isolated gate driver (80*k*) inputting outputs of the second AND circuit and the buffer and forwarding the output of the buffer to the switching device when an output of the second AND circuit is H level such that the power circuit is cut off intermittently during the first predetermined time period when the output of the current sensor exceeds the threshold value.

The system further includes: a latch circuit (801) latching the output of the first AND circuit.

The system according to claim 1, further includes: an alarm signal generator (70, S28) generating an alarm signal when the overcurrent suppressor executes the switching action.

In the system, the robot comprises a legged mobile robot having a body (3), a plurality of legs (2) each connected to the body through a first joint, and feet (22) each connected to each distal end of the legs through a second joint, such that the electric motor is installed at each of the first and second joints.

In the system, the switching device comprises a MOSFET (80*a*).

Japanese Patent Application No. 2004-303837 filed on Oct. 19, 2004 and Japanese Patent Application No. 2005-136011 filed on May 9, 2005 are incorporated herein in its entirety.

While the invention has thus been shown and described with reference to specific embodiments, it should be noted that the invention is in no way limited to the details of the described arrangements; changes and modifications may be made without departing from the scope of the appended claims.

What is claimed is:

1. An overcurrent prevention system for a robot having at least a pair of links connected by a joint, and an electrical system including an electric motor installed at the joint, a power circuit connecting the electric motor to a power source, and a drive circuit installed in the power circuit to supply current to the electric motor in response to a current supply command, comprising:
    a switching device installed in the power circuit and cutting off the drive circuit when turned off;
    a current sensor generating an output indicative of the current supplied to the electric motor through the drive circuits; and
    an overcurrent suppressor comparing the output of the current sensor with a threshold value and executing a switching action for operating the switching device to cut off the power circuit intermittently during a first predetermined time period when the output of the current sensor exceeds the threshold value.

2. The system according to claim 1, wherein the overcurrent suppressor executes the switching action during the first predetermined time period when a second predetermined time period has passed after the output of the current sensor exceeded the threshold value.

3. The system according to claim 1, further including:
    a temperature sensor detecting an ambient temperature; and the overcurrent suppressor changes the threshold value in response to the detected ambient temperature.

4. The system according to claim 1, further including:
    a temperature sensor detecting an ambient temperature; and the overcurrent suppressor changes the first predetermined time period in response to the detected ambient temperature.

5. The system according to claim 2, wherein the overcurrent suppressor comprises;
    a comparator inputting the output of the current sensor and a predetermined voltage indicative of the threshold value and generating an H level output when the output of the current sensor exceeds the threshold value;
    a first delay circuit inputting the output of the comparator and delaying an output by the second predetermined time period;
    a second delay circuit inputting the output of the first delay circuit and delaying an output by the first predetermined time period;
    an EX-OR circuit inputting the outputs of the first and second delay circuits;
    a first AND circuit inputting the same outputs in parallel with the EX-OR circuit;
    an oscillator outputting a pulse train;
    a buffer connected to the EX-OR circuit and passing the output of the oscillator when the EX-OR circuit generates an H level output;
    an electronic control unit outputting an H level signal indicative of the current supply command;
    a second AND circuit inputting outputs of the first AND circuit and the electronic control unit; and an isolated gate driver inputting outputs of the second AND circuit and the buffer and forwarding the output of the buffer to the switching device when an output of the second AND circuit is H level such that the power circuit is cut off intermittently during the first predetermined time period when the output of the current sensor exceeds the threshold value.

6. The system according to claim 5, further including:

a latch circuit latching the output of the first AND circuit.

7. The system according to claim 1, further including:

an alarm signal generator generating an alarm signal when the overcurrent suppressor executes the switching action.

8. The system according to claim 1, wherein the robot comprises a legged mobile robot having a body, a plurality of legs each connected to the body through a first joint, and feet each connected to each distal end of the legs through a second joint, such that the electric motor is installed at each of the first and second joints.

9. The system according to claim 1, wherein the switching device comprises a MOSFET.

10. An overcurrent prevention method of a robot having at least a pair of links connected by a joint, an electrical system including an electric motor installed at the joint, a power circuit connecting the electric motor to a power source, a drive circuit installed in the power circuit to supply current to the electric motor in response to a current supply command, a switching device installed in the power circuit and cutting off the drive circuit when turned off, and a current sensor generating an output indicative of the current supplied to the electric motor through the drive circuits; comprising the step of:

comparing the output of the current sensor with a threshold value and executing a switching action for operating the switching device to cut off the power circuit intermittently during a first predetermined time period when the output of the current sensor exceeds the threshold value.

11. The method according to claim 10, wherein the step of overcurrent suppressing executes the switching action during the first predetermined time period when a second predetermined time period has passed after the output of the current sensor exceeded the threshold value.

12. The method according to claim 10, further including the step of:

detecting an ambient temperature;

and the step of overcurrent suppressing changes the threshold value in response to the detected ambient temperature.

13. The method according to claim 10, further including the step of:

detecting an ambient temperature;

and the step of overcurrent suppressing changes the first predetermined time period in response to the detected ambient temperature.

14. The method according to claim 10, further including the step of:

generating an alarm signal when the overcurrent suppressor executes the switching action.

* * * * *